United States Patent
Shim

(10) Patent No.: US 12,500,975 B2
(45) Date of Patent: Dec. 16, 2025

(54) ELECTRONIC DEVICE AND METHOD OF RECEIVING EMAIL BY THE ELECTRONIC DEVICE

(71) Applicant: Samsung Electronics Co., Ltd., Gyeonggi-do (KR)

(72) Inventor: Minsik Shim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 307 days.

(21) Appl. No.: 17/705,697

(22) Filed: Mar. 28, 2022

(65) Prior Publication Data
US 2022/0303382 A1    Sep. 22, 2022

Related U.S. Application Data

(63) Continuation of application No. PCT/KR2022/003757, filed on Mar. 17, 2022.

(30) Foreign Application Priority Data

Mar. 19, 2021 (KR) .................. 10-2021-0035762

(51) Int. Cl.
| | |
|---|---|
| H04M 1/72 | (2021.01) |
| H04M 1/72436 | (2021.01) |
| H04M 3/42 | (2006.01) |
| H04M 3/48 | (2006.01) |
| H04M 11/10 | (2006.01) |
| H04Q 7/20 | (2006.01) |

(52) U.S. Cl.
CPC .............................. H04M 1/72436 (2021.01)

(58) Field of Classification Search
None
See application file for complete search history.

(56) References Cited

U.S. PATENT DOCUMENTS

| 7,519,398 | B2 | 4/2009 | Hirose | |
|---|---|---|---|---|
| 8,102,986 | B1 * | 1/2012 | McClintock | H04M 1/72436 370/352 |
| 8,280,434 | B2 * | 10/2012 | Garg | H04M 1/72436 704/235 |

(Continued)

FOREIGN PATENT DOCUMENTS

| JP | 2004-265219 A | 9/2004 |
|---|---|---|
| JP | 2006-72755 A | 3/2006 |

(Continued)

OTHER PUBLICATIONS

International Search Report Dated Jun. 27, 2022.
Korean Office Action dated Jul. 31, 2025.

*Primary Examiner* — Pablo N Tran
(74) *Attorney, Agent, or Firm* — Cha & Reiter, LLC

(57) ABSTRACT

An electronic device and method are disclosed. The electronic device includes a memory, a display, a communication circuitry, and a processor. The processor implements the method, including displaying an email configuration screen, determining whether a condition associated with reception of emails is configured in the email configuration screen by user input, when an email is received, analyzing a packet associated with the email, and based on determining that the condition is configured and the packet indicates the condition, outputting an incoming call user interface for the email through a call application.

21 Claims, 14 Drawing Sheets

(56) References Cited

U.S. PATENT DOCUMENTS

| | | | |
|---|---|---|---|
| 8,588,749 B1* | 11/2013 | Sadhvani | H04M 1/725 455/418 |
| 8,606,576 B1 | 12/2013 | Barr et al. | |
| 8,676,273 B1* | 3/2014 | Fujisaki | H04M 1/724 455/418 |
| 9,565,299 B2 | 2/2017 | Shim | |
| 11,638,059 B2* | 4/2023 | Hansen | H04N 21/44227 725/80 |
| 2005/0245287 A1* | 11/2005 | Hirose | G10L 13/00 455/567 |
| 2009/0280788 A1* | 11/2009 | Suomela | H04M 1/72403 455/418 |
| 2012/0036441 A1* | 2/2012 | Basir | H04L 67/04 715/734 |
| 2012/0040644 A1* | 2/2012 | Naik | H04N 1/00307 455/412.1 |
| 2012/0315881 A1* | 12/2012 | Woloshyn | G06Q 10/10 455/412.2 |
| 2013/0035054 A1* | 2/2013 | Ashton | H04M 1/576 455/415 |
| 2013/0295885 A1* | 11/2013 | Rondeau | H04M 3/53391 455/412.1 |
| 2016/0014059 A1* | 1/2016 | Rathod | H04M 1/72484 715/752 |

FOREIGN PATENT DOCUMENTS

| | | |
|---|---|---|
| JP | 2013-77922 A | 4/2013 |
| KR | 20-0257134 Y1 | 12/2001 |
| KR | 10-0685509 B1 | 2/2007 |
| KR | 10-0978443 B1 | 8/2010 |

* cited by examiner

ELECTRONIC DEVICE AND METHOD OF RECEIVING EMAIL BY THE ELECTRONIC DEVICE

CROSS-REFERENCE TO RELATED APPLICATION(S)

This application is a Continuation of and claims priority under 35 U.S.C. § 120 to PCT International Application No. PCT/KR2022/003757, which was filed on Mar. 17, 2022, and claims priority to Korean Patent Application No. 10-2021-0035762, filed on Mar. 19, 2021, in the Korean Intellectual Property Office, the disclosures of which are incorporated by reference herein their entirety.

BACKGROUND

Technical Field

Certain embodiments of the disclosure relate to an electronic device communications and, more particularly, to reception of e-mails by electronic devices.

Description of Related Art

Electronic devices such as smart phones, tablet personal computers (PCs), portable multimedia players (PMPs), personal digital assistants (PDAs), laptop personal computers (laptop PCs), and wearable devices provide a variety of functions, such as an email access, and a social network services (SNS), in addition to traditional communication functions, such as phone calls and text messages.

SUMMARY

An electronic device and a method for the electronic device are disclosed herein, certain embodiments in which email may be utilized in connection with a call function.

According to certain embodiments of the disclosure, an electronic device includes a memory; a display module; a communication module; and a processor, wherein the processor is configured to control the display module to display an email configuration screen, determine whether a condition associated with reception of emails is configured by a user input in the email configuration screen, when an email is received, analyze a packet associated with the email, and based on determining that the condition is configured and the packet indicates the condition, output an incoming call user interface for the email through a call application.

According to certain embodiments of the disclosure, a method of receiving an email by an electronic device includes displaying an email configuration screen, determine whether a condition is configured by a user input in the email configuration screen, wherein the condition, when detected, causes an email to be received as an incoming call, receiving an email and analyzing a packet associated with the email, and based on determining that the condition is configured and that the packet indicates the condition, outputting an incoming call user interface for the email through a call application.

An electronic device and a method of receiving an email by the electronic device according to certain embodiments of the disclosure may have the advantage of immediately notifying a user when an important email is received.

DETAILED DESCRIPTION

Figure 1:
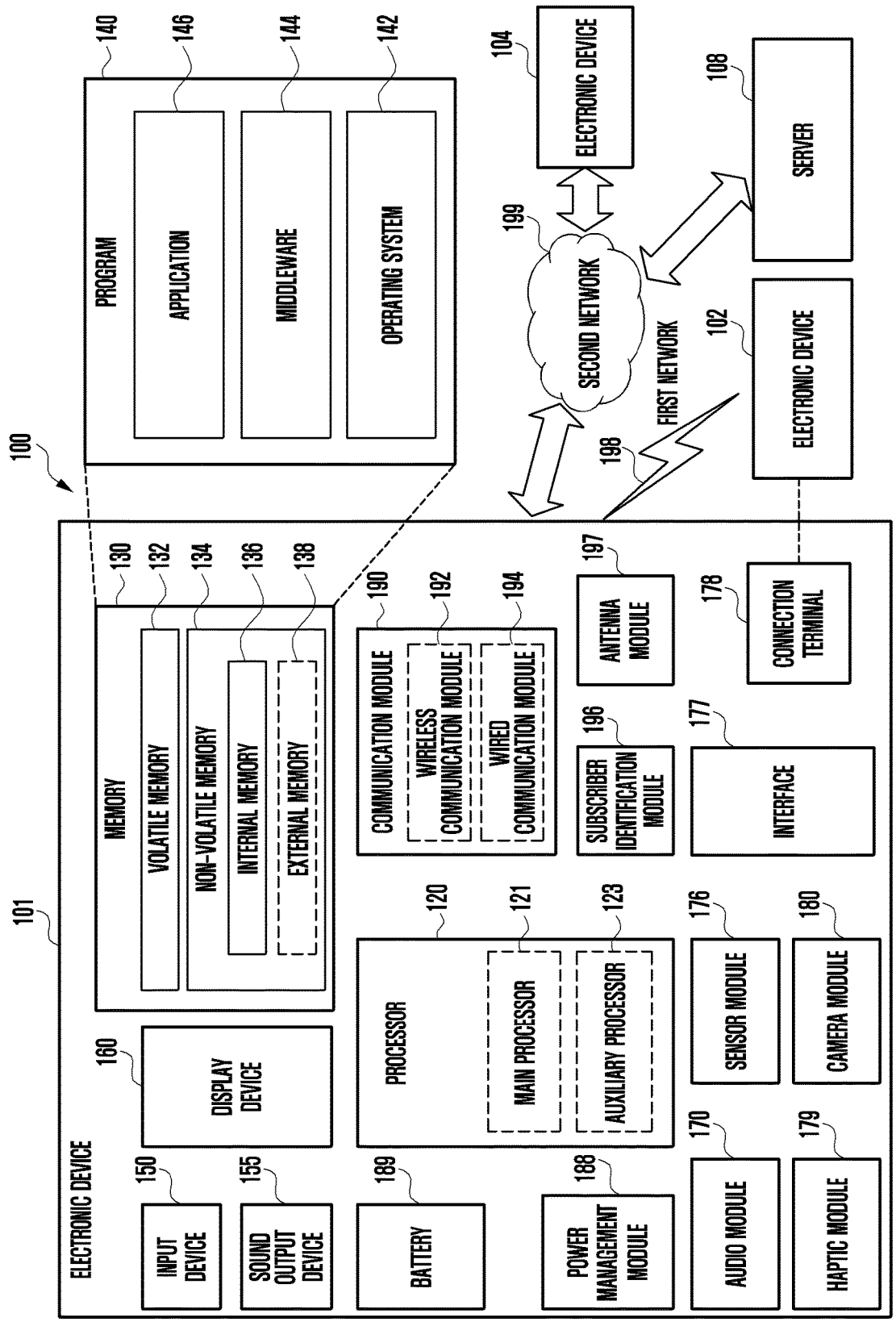
FIG. 1 is a block diagram illustrating an electronic device according to certain embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
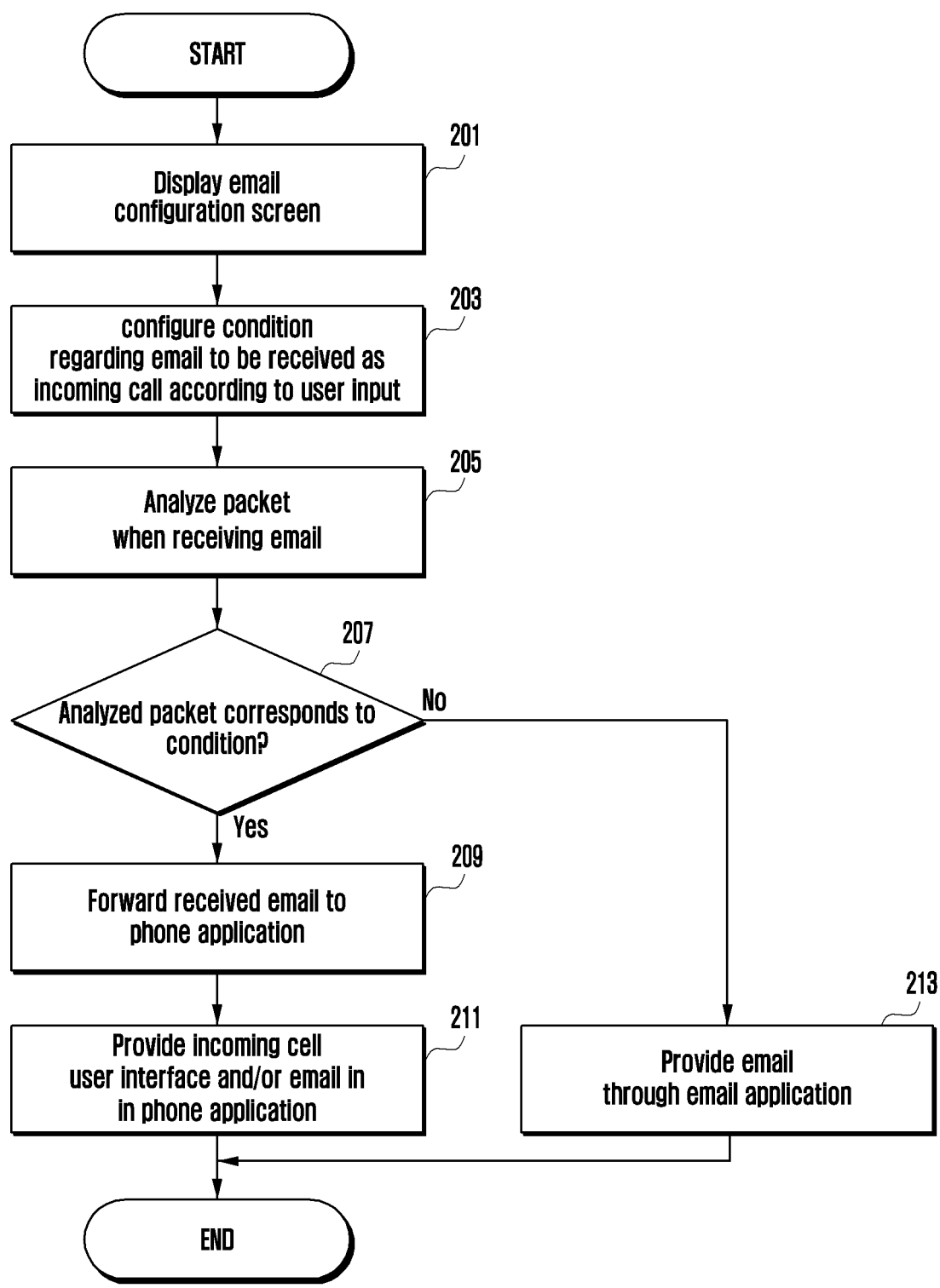
FIG. 2 is a flowchart illustrating a method of receiving an email by an electronic device according to certain embodiments of the disclosure.

FIG. 2 is a flowchart illustrating a method of receiving an email by an electronic device according to certain embodiments of the disclosure.

The electronic device 101 may perform operation of displaying an email configuration screen in operation 201 under the control of the processor 120.

In certain embodiments, the electronic device 101 may execute an email application and display an email configuration screen based on a user input in operation 201 under the control of the processor 120.

In certain embodiments, the electronic device 101 may execute a phone application and display an email configuration screen based on a user input in operation 201 under the control of the processor 120.

In certain embodiments, when an email application is executed, the electronic device 101 may display an email application execution screen and/or an email setting item on the display module 160. The electronic device 101 may receive a user input for selecting an email setting item on the email application execution screen displayed on the display module 160. When receiving a user input for selecting an email setting item, the electronic device 101 may display a user interface related to the email setting item on the display module 160. The user input may be, for example, an input through the input module 150 or a touch input through the display module 160.

In certain embodiments, when a phone application is executed, the electronic device 101 may display a phone application execution screen and/or an email setting item on the display module 160. The electronic device 101 may receive a user input for selecting an email setting item on the phone application execution screen displayed on the display module 160. When receiving a user input for selecting an email setting item, the electronic device 101 may display a user interface related to the email setting item on the display module 160. The user input may be, for example, an input through the input module 150 or a touch input through the display module 160.

The electronic device 101 may configure a condition that, when detected, will cause an email to be received as an incoming call according to a user input in operation 203 under the control of the processor 120.

In certain embodiments, the incoming call may be a function operating inside the electronic device 101 rather than a communication network. In the electronic device 101, operation of displaying or notifying a user interface (UI)/user experience (UX) of an incoming call on the display module 160 may use at least a portion of information using in a phone application. The incoming call may be referred to as a fake call.

In certain embodiments, when a condition regarding an email to be received as an incoming call is configured, if the email corresponding to the condition is received, the electronic device 101 may notify a user of reception of the email using the incoming call user interface of the phone application. The incoming call user interface may include, for example, at least one of a visual notification, an audible notification, and/or a tactile notification.

In certain embodiments, the electronic device 101 may display a condition regarding an email to be received as an incoming call on the display module 160.

The electronic device 101 may change and/or configure a condition regarding an email to be received as an incoming call according to a user input.

In certain embodiments, the condition regarding the email to be received as an incoming call may include a reception option condition on whether to display the email received as an incoming call user interface.

In certain embodiments, the condition regarding the email to be received as an incoming call may include at least one of a sender condition, a subject condition, a recipient condition and cc condition, a keyword condition, or an email option condition. The email option condition may include, for example, at least one of urgency or a response request.

In certain embodiments, the condition regarding the email to be received as an incoming call may include at least one of a reception option condition, a sender condition, a subject condition, a recipient condition and cc condition, a keyword condition, or an email option condition.

In certain embodiments, the electronic device 101 may store, in the memory 130, a condition regarding an email to be received as an incoming call selected according to a user input.

In certain embodiments, the electronic device 101 may store, in the memory 130, a condition regarding an email to be received as an incoming call input according to a user input.

In certain embodiments, the sender condition, the subject condition, the recipient condition and cc condition, the keyword condition, and the email option condition may be input as a text according to a user input. The sender condition, the subject condition, the recipient condition and cc condition, the keyword condition, and the email option condition may be selected through checkboxes according to a user input.

When receiving an email, the electronic device 101 may analyze a packet of the email in operation 205 under the control of the processor 120.

The electronic device 101 may determine whether the analyzed packet corresponds to the configured condition in operation 207 under the control of the processor 120.

In certain embodiments, the electronic device 101 may determine whether the analyzed packet corresponds to a condition regarding an email to be received as an incoming call in operation 207 under the control of the processor 120.

In certain embodiments, the electronic device 101 may determine whether the analyzed packet corresponds to at least one of a reception option condition, a sender condition, a subject condition, a recipient condition and cc condition, a keyword condition, or an email option condition in operation 207 under the control of the processor 120.

If the analyzed packet indicates some data that matches the configured condition, the electronic device 101 may switch from operation 207 to operation 209 under the control of the processor 120.

If the analyzed packet does not correspond to the condition, the electronic device 101 may switch from operation 207 to operation 213 under the control of the processor 120.

When the analyzed packet associated with the email indicated the configured condition, the electronic device 101 may forward the received email to the phone application in operation 209 under the control of the processor 120.

The electronic device 101 may forward an event corresponding to an email reception event to the phone application in operation 209 under the control of the processor 120.

When receiving an email that meets a condition, the electronic device 101 may forward an event corresponding to the email reception event to the phone application in operation 209 under the control of the processor 120.

The electronic device 101 may forward the received email and/or an ID of the received email to the phone application in operation 209 under the control of the processor 120.

The electronic device 101 may provide an incoming call user interface (e.g., an incoming call screen in which a call can be received or rejected) for the email (e.g., presenting the email as an incoming call in the phone application) in operation 211 under the control of the processor 120.

In certain embodiments, the electronic device 101 may provide an incoming call user interface and/or an email in the phone application on the display module 160 in operation 211 under the control of the processor 120.

In certain embodiments, the electronic device 101 may display an incoming call user interface and/or an email in the phone application in operation 211 under the control of the processor 120.

In certain embodiments, the incoming call user interface may include, for example, at least one of a visual notification, an audible notification, and/or a tactile notification.

In certain embodiments, the electronic device 101 may display an email as a call log in the phone application in operation 211 under the control of the processor 120.

In certain embodiments, if the email content includes a phone number, the electronic device 101 may display the phone number included in the email content as a call log in operation 211 under the control of the processor 120.

In certain embodiments, when the email content includes a phone number, the electronic device 101 may display the phone number included in the email content on a phone input screen of the phone application in operation 211 under the control of the processor 120.

In certain embodiments, the electronic device 101 may manage an email as a call log in the phone application in operation 211 under the control of the processor 120.

In certain embodiments, the electronic device 101 may call the email application in the phone application to display the email and/or contents of the email in operation 211 under the control of the processor 120.

The electronic device 101 may provide an email through the email application in operation 213 under the control of the processor 120.

In certain embodiments, the electronic device 101 may display the email through the email application in operation 213 under the control of the processor 120.

In certain embodiments, the electronic device 101 may output a notification indicating reception of the email through the email application in operation 213 under the control of the processor 120.

Figure 3:
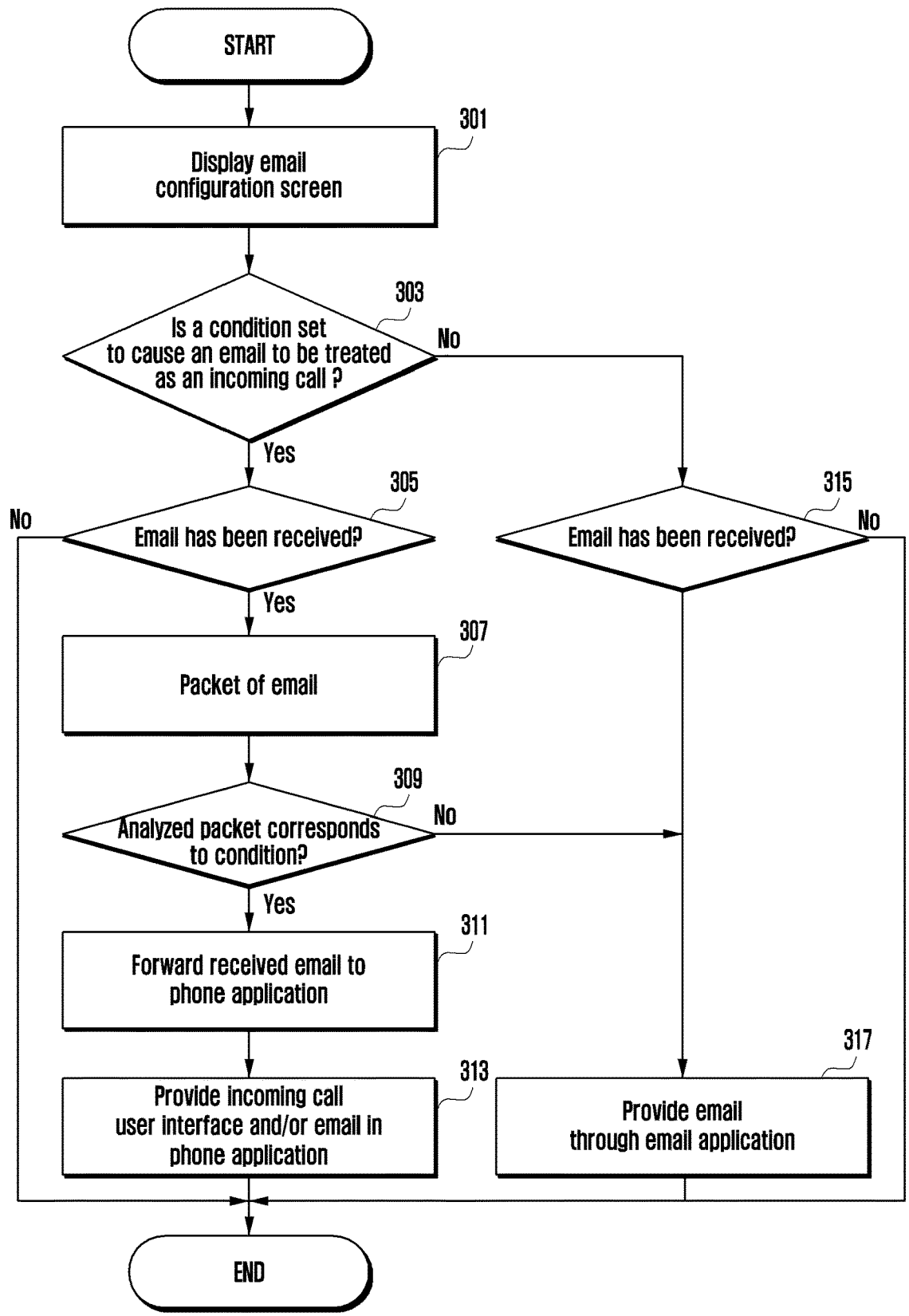
FIG. 3 is a flowchart illustrating a method of receiving an email by an electronic device according to certain embodiments of the disclosure.

FIG. 3 is a flowchart illustrating a method of receiving an email by an electronic device according to certain embodiments of the disclosure.

The electronic device 101 may perform operation of displaying an email configuration screen in operation 301 under the control of the processor 120.

In certain embodiments, the electronic device 101 may execute an email application and display an email configuration screen based on a user input in operation 301 under the control of the processor 120.

In certain embodiments, the electronic device 101 may execute a phone application and display an email configuration screen based on a user input in operation 301 under the control of the processor 120.

In certain embodiments, when the email application is executed, the electronic device 101 may display an email application execution screen and/or an email setting item on the display module 160. The electronic device 101 may receive a user input for selecting an email setting item on the email application execution screen displayed on the display module 160. When receiving a user input for selecting an email setting item, the electronic device 101 may display a user interface related to the email setting item on the display module 160. The user input may be, for example, an input through the input module 150 or a touch input through the display module 160.

In certain embodiments, when a phone application is executed, the electronic device 101 may display a phone application execution screen and/or an email setting item on the display module 160. The electronic device 101 may receive a user input for selecting an email setting item on the phone application execution screen displayed on the display module 160. When receiving a user input for selecting an email setting item, the electronic device 101 may display a user interface related to the email setting item on the display module 160. The user input may be, for example, an input through the input module 150 or a touch input through the display module 160.

The electronic device 101 may determine whether a condition is configured which, when detected, will cause an email to be received as an incoming call (and/or a notification generated therein) according to a user input, in operation 303 under the control of the processor 120.

In certain embodiments, the electronic device 101 may display a condition regarding an email to be received as an incoming call on the display module 160.

The electronic device 101 may change and/or configure a condition regarding an email to be received as an incoming call according to a user input.

In certain embodiments, the condition regarding the email to be received as an incoming call may include a reception option condition on whether to display the email received as an incoming call user interface.

In certain embodiments, the condition regarding the email to be received as an incoming call may include at least one of a sender condition, a subject condition, a recipient condition and cc condition, a keyword condition, or an email option condition. The email option condition may include, for example, at least one of urgency or a response request.

In certain embodiments, the condition regarding the email to be received as an incoming call may include at least one of a reception option condition, a sender condition, a subject condition, a recipient condition and cc condition, a keyword condition, or an email option condition.

In certain embodiments, the incoming call may be a function operating inside the electronic device 101 rather than a communication network. In the electronic device 101, operation of displaying or notifying a user interface (UI)/ user experience (UX) of an incoming call on the display module 160 may use at least a portion of information using in a phone application. The incoming call may be referred to as a fake call.

In certain embodiments, the electronic device 101 may store, in the memory 130, a condition regarding an email to be received as an incoming call selected according to a user input.

In certain embodiments, the electronic device 101 may store, in the memory 130, a condition regarding an email to be received as an incoming call input according to a user input.

In certain embodiments, the sender condition, the subject condition, the recipient condition and cc condition, the keyword condition, and the email option condition may be input as a text according to a user input. The sender condition, the subject condition, the recipient condition and cc condition, the keyword condition, and the email option condition may be selected through checkboxes according to a user input.

If a condition regarding an email to be received as an incoming call according to a user input is configured, the electronic device 101 may switch from operation 303 to operation 305 under the control of the processor 120.

If a condition regarding an email to be received as an incoming call according to a user input is not configured, the electronic device 101 may switch from operation 303 to operation 315 under the control of the processor 120.

The electronic device 101 may determine whether an email has been received in operation 305 under the control of the processor 120.

If the email has been received, the electronic device 101 may switch from operation 305 to operation 307 under the control of the processor 120.

In certain embodiments, the electronic device 101 may determine whether an email has been received from the server 108 through the communication module 190 in operation 305 under the control of the processor 120. In order to receive and/or transmit an email, the electronic device 101 may store in advance an email address or an address of an email server in the memory 130.

When the email is received, the electronic device 101 may analyze a packet of the email in operation 307 under the control of the processor 120.

The electronic device 101 may determine whether the analyzed packet corresponds to a condition in operation 309 under the control of the processor 120.

In certain embodiments, the electronic device 101 may determine whether the analyzed packet corresponds to or indicates the configured condition regarding an email to be received as an incoming call in operation 309 under the control of the processor 120.

In certain embodiments, the electronic device 101 may determine whether the analyzed packet corresponds to at least one of a reception option condition, a sender condition, a subject condition, a recipient condition and cc condition, a keyword condition, or an email option condition in operation 309 under the control of the processor 120.

If the analyzed packet corresponds to the condition, the electronic device 101 may switch from operation 309 to operation 311 under the control of the processor 120.

If the analyzed packet does not correspond to the condition, the electronic device 101 may switch from operation 309 to operation 317 under the control of the processor 120.

When the analyzed packet indicates the condition, the electronic device 101 may forward the received email to the phone application in operation 311 under the control of the processor 120.

The electronic device 101 may forward an event corresponding to an email reception event to the phone application in operation 311 under the control of the processor 120.

When receiving an email that meets a condition, the electronic device 101 may forward an event corresponding to an email reception event to the phone application in operation 309 under the control of the processor 120.

The electronic device 101 may forward the received email and/or an ID of the received email to the phone application in operation 311 under the control of the processor 120.

The electronic device 101 may provide an incoming call user interface for the email in the phone application in operation 313 under the control of the processor 120.

In certain embodiments, the electronic device 101 may display an incoming call user interface for the email in the phone application in operation 313 under the control of the processor 120.

In certain embodiments, the electronic device 101 may display an incoming call user interface and/or the email itself in the phone application on the display module 160 in operation 313 under the control of the processor 120.

In certain embodiments, the incoming call user interface may include, for example, at least one of a visual notification, an audible notification, and/or a tactile notification.

In certain embodiments, the electronic device 101 may display an email as a call log in the phone application in operation 313 under the control of the processor 120.

In certain embodiments, the electronic device 101 may manage an email as a call log in the phone application in operation 313 under the control of the processor 120.

In certain embodiments, the electronic device 101 may call an email application in the phone application to display an email and/or contents of the email in operation 313 under the control of the processor 120.

The electronic device 101 may display the email through the email application in operation 313 under the control of the processor 120.

If a condition regarding an email to be received as an incoming call according to a user input is not configured, electronic device 101 may determine whether an email has been received in operation 315 under the control of the processor 120.

The electronic device 101 may determine whether an email has been received in operation 315 under the control of the processor 120.

If the email has been received, the electronic device 101 may switch from operation 315 to operation 317 under the control of the processor 120.

The electronic device 101 may provide an email through the email application in operation 317 under the control of the processor 120.

In certain embodiments, the electronic device 101 may display an email through the email application in operation 317 under the control of the processor 120.

In certain embodiments, the electronic device 101 may notify reception of an email through the email application in operation 317 under the control of the processor 120.

In certain embodiments, the electronic device 101 may display an email in which a condition regarding an email to be received as an incoming call is not configured through the email application in operation 317 under the control of the processor 120. can In certain embodiments, the electronic device 101 may display an email in which the analyzed packet does not correspond to a condition through the email application in operation 317 under the control of the processor 120.

Figure 4:
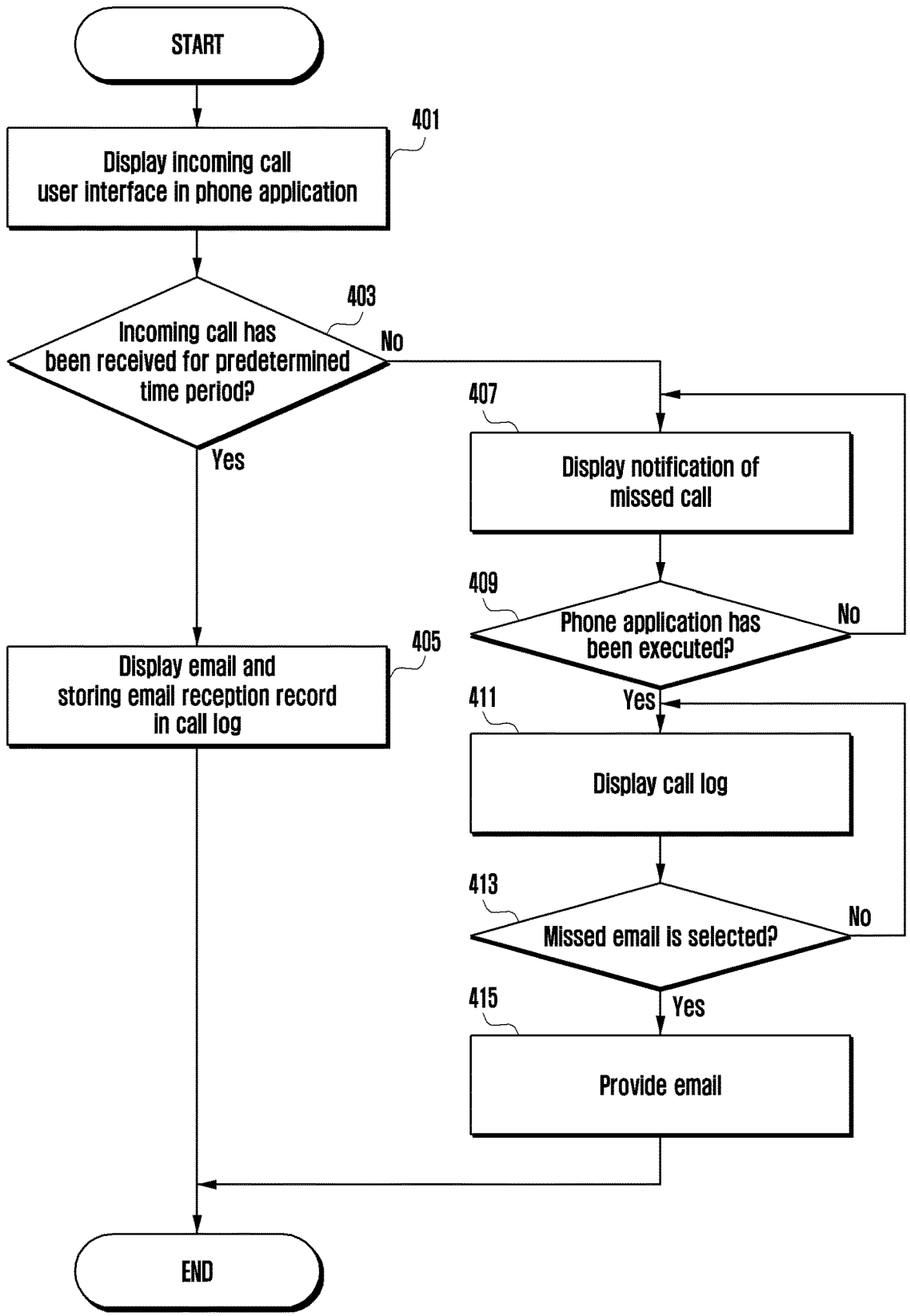
FIG. 4 is a flowchart illustrating a method of displaying an email through a phone application according to certain embodiments of the disclosure.

FIG. 4 is a flowchart illustrating a method of displaying an email through a phone application according to certain embodiments of the disclosure.

The electronic device 101 may provide an incoming call user interface (e.g., notification) in a phone application in operation 401 under the control of the processor 120.

In certain embodiments, if the analyzed packet of the email corresponds to a condition regarding an email to be received as an incoming call, the electronic device 101 may provide an incoming call user interface in the phone application in operation 401 under the control of the processor 120.

In certain embodiments, a condition regarding an email to be received as an incoming call may include at least one of a reception option condition, a sender condition, a subject condition, a recipient condition and cc condition, a keyword condition, or an email option condition.

In certain embodiments, the condition regarding an email to be received as an incoming call may be configured according to a user input. The condition regarding the email to be received as an incoming call may be stored in advance in the memory 130 of the electronic device 101.

In certain embodiments, the incoming call user interface may include, for example, at least one of a visual notification, an audible notification, and/or a tactile notification.

In certain embodiments, the incoming call may be a function operating inside the electronic device 101 rather than a communication network. In the electronic device 101, operation of displaying or notifying a user interface (UI)/user experience (UX) of an incoming call on the display module 160 may use at least a portion of information using in the phone application. The incoming call may be referred to as a fake call.

The electronic device 101 may determine whether the incoming call user interface for the email (e.g., the fake call) is received for a predetermined time period in operation 403, under the control of the processor 120. The predetermined time may be a time determined by a manufacturer of the electronic device 101.

In certain embodiments, an operation in which the electronic device 101 receives an incoming call for a predetermined time under the control of the processor 120 may be an operation of receiving a user input to the user interface related to incoming call reception on the display module 160.

In certain embodiments, an operation in which the electronic device 101 receives an incoming call for a predetermined time under the control of the processor 120 may be an operation of receiving a user input regarding incoming call reception while displaying the user interface related to the incoming call.

In certain embodiments, an operation in which the electronic device 101 receives an incoming call for a predetermined time under the control of the processor 120 may be an operation of receiving a user input through the input module 150 while displaying the user interface related to the incoming call.

In certain embodiments, an operation in which the electronic device 101 does not receive an incoming call for a predetermined time under the control of the processor 120 may be an operation of not receiving a user input regarding incoming call reception within the predetermined time.

In certain embodiments, an operation in which the electronic device 101 does not receive an incoming call for a predetermined time under the control of the processor 120 may be an operation of receiving a user input to a user interface related to incoming call reception rejection on the display module 160.

In certain embodiments, an operation in which the electronic device 101 does not receive an incoming call for a predetermined time period under the control of the processor 120 may be an operation of receiving a user input regarding incoming call reception rejection while displaying the user interface related to the incoming call.

In certain embodiments, an operation in which the electronic device 101 does not receive an incoming call for a predetermined time period under the control of the processor 120 may be an operation of receiving a user input regarding incoming call reception rejection through the input module 150 while displaying the user interface related to the incoming call.

When receiving an incoming call for a predetermined time period under the control of the processor 120, the electronic device 101 may switch from operation 403 to operation 405.

If the electronic device 101 does not receive an incoming call for a predetermined time period under the control of the processor 120, the electronic device 101 may switch from operation 403 to operation 407.

If an incoming call is received for a predetermined time period, the electronic device 101 may display the corresponding email and store the email reception record in a call log in operation 405 under the control of the processor 120.

In certain embodiments, if an incoming call is received for a predetermined time period, the electronic device 101 may display the email in operation 405 under the control of the processor 120.

In certain embodiments, the electronic device 101 may display an email, and display the reception record included in the call log when the display of the email is ended according to a user input in operation 405 under the control of the processor 120.

If an incoming call is not received for a predetermined time period, the electronic device 101 may display a notification for the missed call on the display module 160 in operation 407 under the control of the processor 120.

For example, operation of displaying a notification of a missed call may be operation of displaying the number of missed emails with a number badge on a phone icon on a home screen of the electronic device 101.

When the user identifies an email recorded as a missed call, the number of missed mails displayed with a number badge on the phone icon on the home screen may be removed.

For example, operation of displaying a notification of a missed call may be operation of displaying a missed email with a notification on a lock screen. When a missed email is displayed with a notification on the lock screen, if the electronic device 101 selects a missed email on the lock screen according to a user input under the control of the processor 120, the email application and/or the phone application may be executed, and email contents may be displayed on the display module 160. When a missed email is displayed with a notification on the lock screen, the electronic device 101 may display an address of the email and/or a portion of contents of the email through the display module 160.

When the user identifies an email recorded as a missed call, a notification of a missed email may be removed on the lock screen.

The electronic device 101 may determine whether the phone application is executed in operation 409 under the control of the processor 120. The electronic device 101 may execute the phone application based on a user input.

If the phone application is executed under the control of the processor 120, the electronic device 101 may switch from operation 409 to operation 411.

If the phone application is not executed under the control of the processor 120, the electronic device 101 may switch from operation 409 to operation 407.

The electronic device 101 may display the call log on the display module 160 in operation 411 under the control of the processor 120. The call log may include at least one of outgoing calls, inbound calls, and received emails.

The electronic device 101 may determine whether a missed email is selected from the call log in operation 413 under the control of the processor 120.

If a missed email is selected from the call log under the control of the processor 120, the electronic device 101 may switch from operation 413 to operation 415.

If a missed email is not selected from the call log under the control of the processor 120, the electronic device 101 may switch from operation 413 to operation 411.

If a missed email is selected from the call log, the electronic device 101 may provide (e.g., display) the email in operation 415 under the control of the processor 120.

Figure 5A:
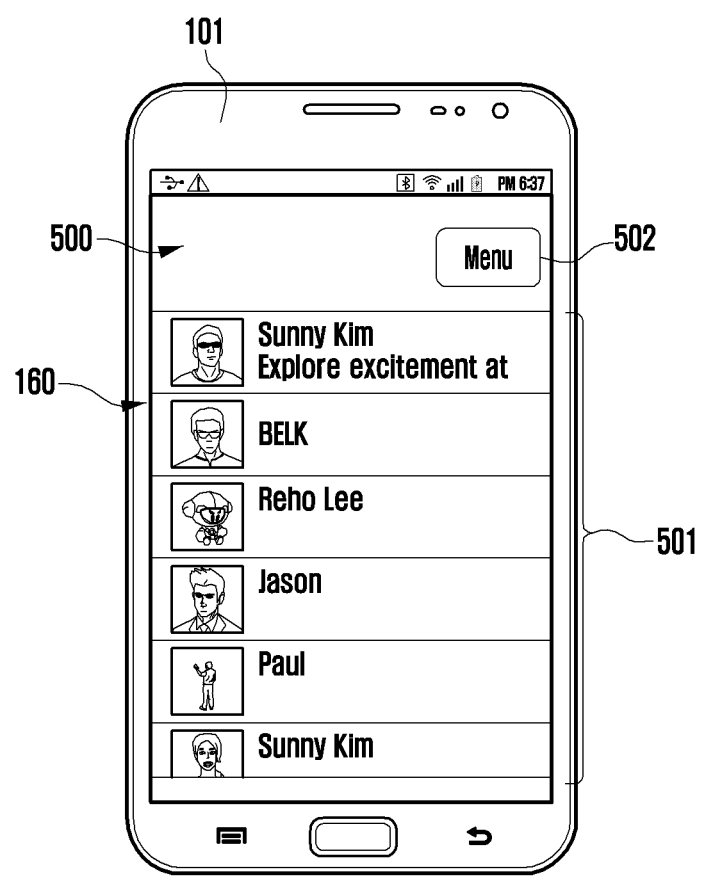
FIG. 5A is a diagram illustrating an email application execution screen according to certain embodiments of the disclosure.
Figure 5B:
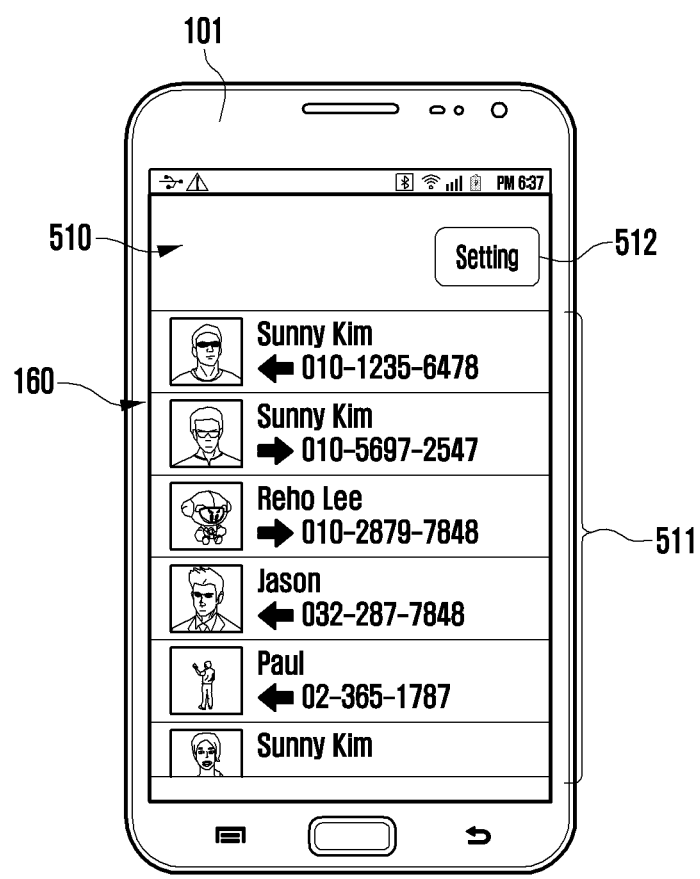
FIG. 5B is a diagram illustrating an email application execution screen according to certain embodiments of the disclosure.

FIG. 5A is a diagram illustrating an email application execution screen according to certain embodiments of the disclosure. FIG. 5B is a diagram illustrating an email application execution screen according to certain embodiments of the disclosure.

Figure 6A:
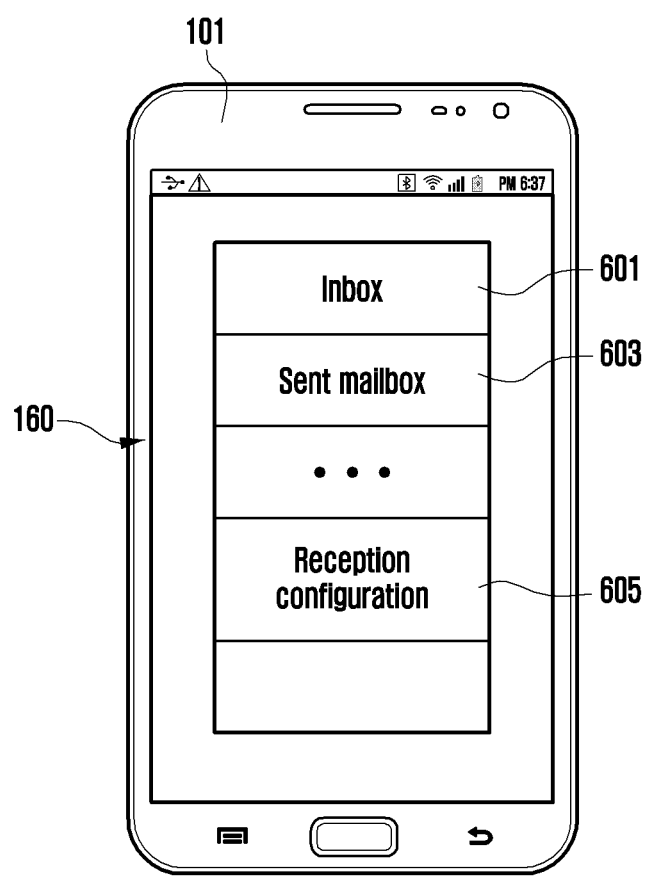
FIG. 6A is a diagram illustrating setting items according to certain embodiments of the disclosure.

FIG. 6A is a diagram illustrating setting items in an email application according to certain embodiments of the disclosure.

Figure 6B:
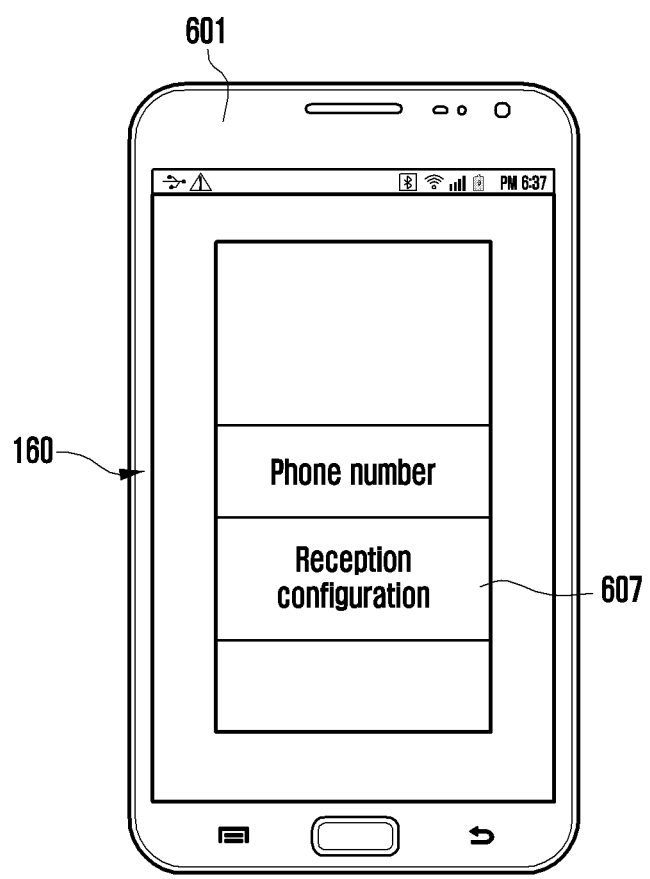
FIG. 6B is a diagram illustrating setting items according to certain embodiments of the disclosure.

FIG. 6B is a diagram illustrating setting items in a phone application according to certain embodiments of the disclosure.

Figure 7:
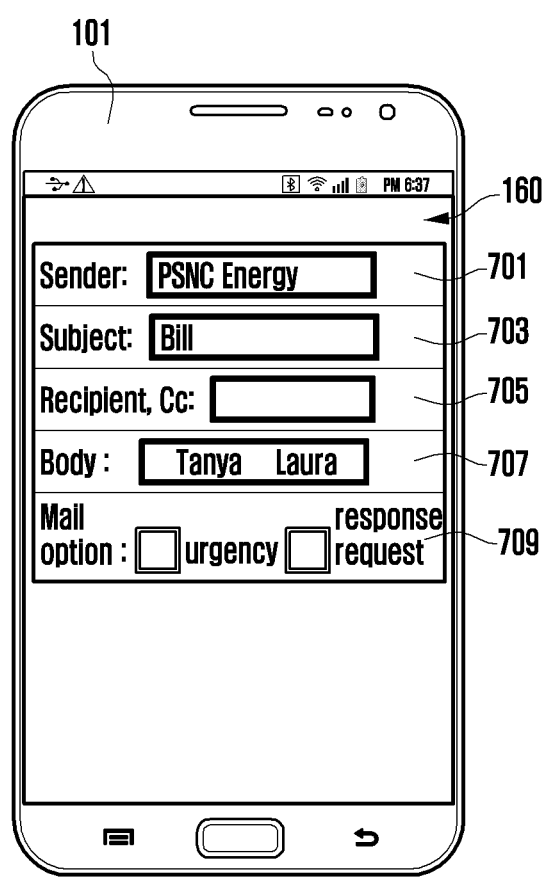
FIG. 7 is a diagram illustrating a condition configuration regarding an email to be received as an incoming call according to certain embodiments of the disclosure.

FIG. 7 is a diagram illustrating a condition configuration regarding an email to be received as an incoming call according to certain embodiments of the disclosure.

With reference to FIG. 5A, the electronic device 101 may display an email application execution screen 500 on the display module 160. The email application execution screen 500 may include a sent email list and/or a received email list 501, and a setting item 502. For example, the setting item 502 may include a menu item.

With reference to FIGS. 5A and 6A, when a setting item 502 is selected based on a user input, the electronic device 101 may display a user interface related to the setting item 502 on the display module 160.

The user interface related to the setting item 502 may include at least one of an inbox related item 601, a sent mailbox related item 603, or a reception configuration related item 605. The reception configuration related item 605 may be an item for configuring an email to be received as an incoming call.

With reference to FIGS. 6A and 7, when the reception configuration related item 605 is selected based on a user input, the electronic device 101 may display a user interface related to the reception configuration on the display module 160.

The user interface related to the reception configuration may include a condition that, when detected, causes an email to be received as an incoming call. The electronic device 101 may display a user interface related to a condition regarding an email to be received as an incoming call.

Referring to FIG. 7, the condition for receiving the email as an incoming call may include at least one of a reception option condition, a sender condition 701, a subject condition 703, a recipient condition and carbon copy "cc" condition 705, a body keyword condition 707, or an email option condition 709. Thus, e-mails from certain parties (701), for certain subjects (703), certain recipients (705), having certain keywords in the body of the email (707), and having certain associated metadata tags such as "urgent" or "response requested" (709) may trigger treatment of the corresponding email as an incoming call.

With reference to FIG. 5B, the electronic device 101 may display a phone application execution screen 510 on the display module 160. The phone application execution screen 510 may include a sent/received call log 511 and a setting item 512. For example, the setting item 512 may include a menu item.

With reference to FIGS. 5B and 6B, when a setting item 512 is selected based on a user input, the electronic device 101 may display a user interface related to the setting item 512 on the display module 160.

The user interface related to the setting item 512 may include a reception configuration related item 607. The reception configuration related item 607 may be an item selectable for configuring an email to be received as an incoming call.

With reference to FIGS. 6B and 7, when the reception configuration related item 607 is selected based on a user input, the electronic device 101 may display the user interface related to the reception configuration on the display module 160 as seen in FIG. 7.

The user interface related to the reception configuration may include a condition that causes an email to be received as an incoming call when detected. The electronic device 101 may display a user interface related to a condition regarding an email to be received as an incoming call.

As already noted above, the condition regarding an email to be received as the incoming call may include at least one of a reception option condition, a sender condition 701, a subject condition 703, a recipient condition and cc condition 705, a body keyword condition 707, or an email option condition 709.

Figure 8:
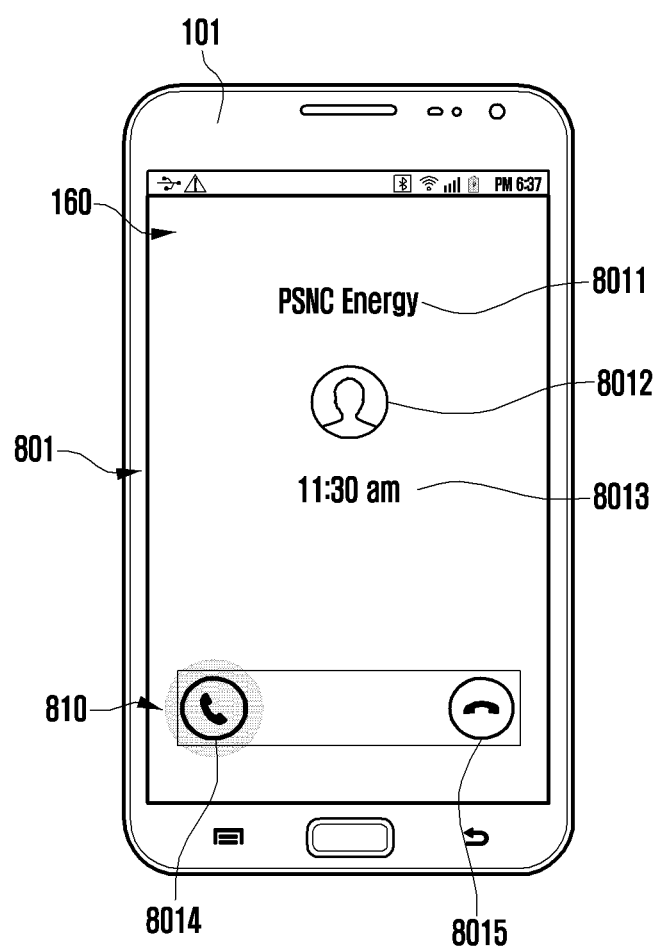
FIG. 8 is a diagram illustrating an operation in which an electronic device displays an incoming call user interface in a phone application according to certain embodiments of the disclosure.

FIG. 8 is a diagram illustrating an operation in which the electronic device 101 displays an incoming call user interface 801 in a phone application according to certain embodiments of the disclosure.

When receiving an email, the electronic device 101 may analyze a packet associated with the received email under the control of the processor 120.

The electronic device 101 may determine whether the analyzed packet indicates the condition that, when detected, causes the corresponding email to be received as an incoming call under the control of the processor 120.

If the analyzed packet corresponds to the condition, the electronic device 101 may provide the incoming call user interface 801 of FIG. 8 in the phone application on the display module 160 under the control of the processor 120.

The incoming call user interface 801 may include at least one of an email sender's name and/or address 8011, an email sender's picture and/or image 8012, an email received time 8013, an incoming call response icon 8014, or an incoming call rejection icon 8015, as seen in FIG. 8.

The electronic device 101 may receive a user input 810 for selecting an incoming call response icon 8014 in the incoming call user interface 801.

Figure 9:
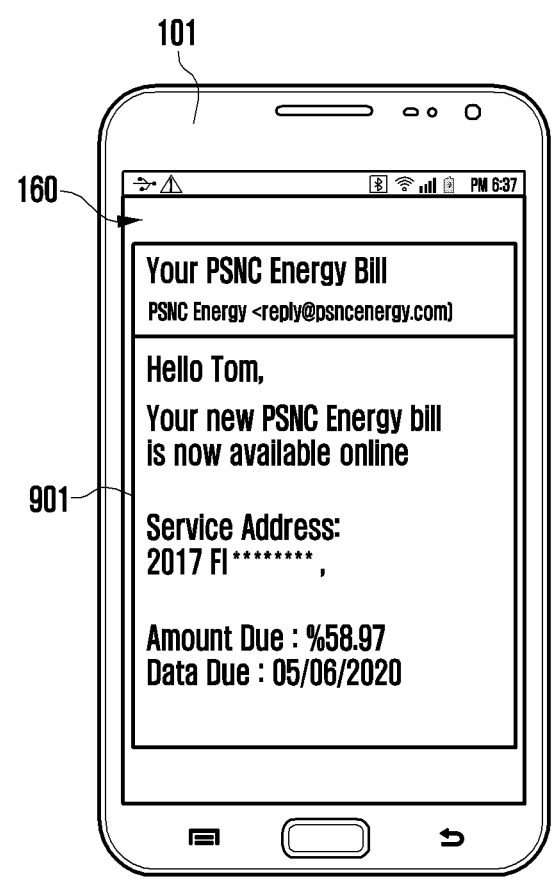
FIG. 9 is a diagram illustrating an operation in which an electronic device displays an email according to a user input of selecting an incoming call response icon according to certain embodiments of the disclosure.

FIG. 9 is a diagram illustrating operation of displaying an email according to a user input 810 for selecting an incoming call response icon 8014 by the electronic device 101 according to certain embodiments of the disclosure.

When receiving the user input 810 selecting the incoming call response icon 8014 in the incoming call user interface 801, the electronic device 101 may display contents 901 of the email on the display module 160.

Figure 10:
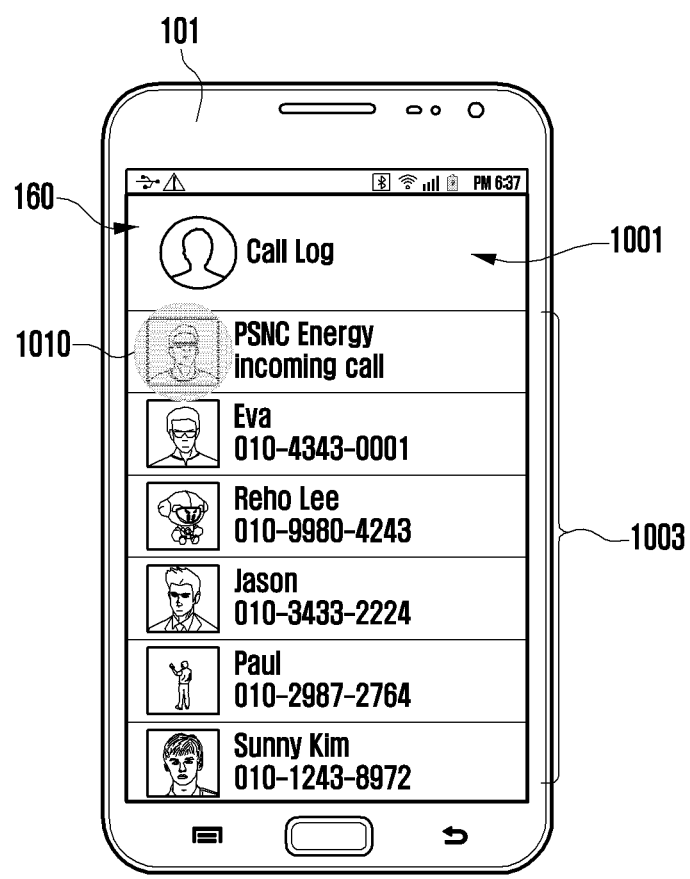
FIG. 10 is a diagram illustrating operation of displaying a call log by an electronic device according to certain embodiments of the disclosure.

FIG. 10 is a diagram illustrating an operation in which the electronic device 101 displays a call log 1001 according to certain embodiments of the disclosure.

After displaying contents 901 of the email on the display module 160, the electronic device 101 may terminate display of the contents 901 of the email according to another user input.

When the display of the contents 901 of the email is terminated, the electronic device 101 may display the call log 1001 on the display module 160. The call log 1001 may include a list 1003 including at least one of outbound calls, inbound calls and emails received through the phone application.

When an email reception record is selected according to a user input 1010, the electronic device 101 may display the contents 901 of the email, as illustrated in FIG. 9.

Figure 11:
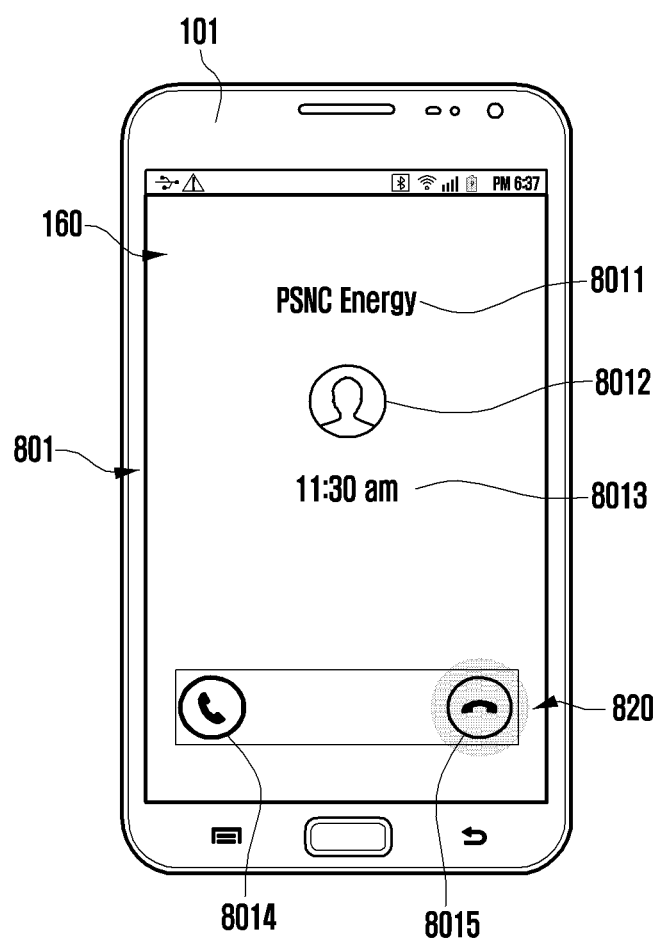
FIG. 11 is a diagram illustrating an operation in which an electronic device displays an incoming call user interface in a phone application according to certain embodiments of the disclosure.

FIG. 11 is a diagram illustrating an operation in which the electronic device 101 displays an incoming call user interface 801 in a phone application according to certain embodiments of the disclosure.

When receiving an email, the electronic device 101 may analyze a packet of the received email under the control of the processor 120.

The electronic device 101 may determine whether the analyzed packet corresponds to the configured condition that, when detected, causes an email to be received as an incoming call under the control of the processor 120.

If the analyzed packet corresponds to the condition, the electronic device 101 may provide an incoming call user interface (e.g., notification) 801 in the phone application on the display module 160 under the control of the processor 120.

The incoming call user interface 801 may include at least one of the email sender's name and/or address 8011, the email sender's picture and/or image 8012, the email received time 8013, the incoming call response icon 8014, or incoming call rejection icon 8015.

The electronic device 101 may receive a user input 820 selecting the incoming call rejection icon 8015 in the incoming call user interface 801.

Figure 12:
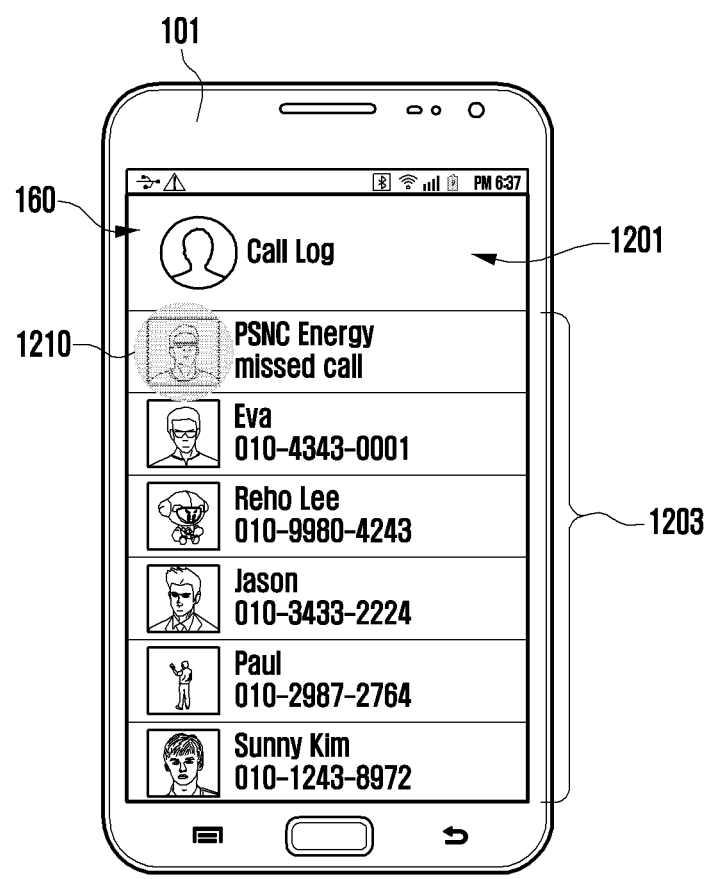
FIG. 12 is a diagram illustrating an operation in which an electronic device displays a call log.

FIG. 12 is a diagram illustrating an operation in which the electronic device 101 displays a call log.

When receiving the user input 820 selecting the incoming call rejection icon 8015 in the incoming call user interface 801, the electronic device 101 may store the received email as a missed call item 1203 within the call log 1201.

In certain embodiments, when the electronic device 101 does not receive an incoming call for a predetermined time period, the electronic device 101 may store the received email as the missed call item 1203 on the call log 1201.

When a user input 1210 is received in the received email in the missed call item 1203, the electronic device 101 may display the contents 901 of the email, as illustrated in FIG. 9.

The electronic device according to certain embodiments disclosed in this document may be various types of devices. The electronic device may include, for example, a portable communication device (e.g., smart phone), a computer device, a portable multimedia device, a portable medical device, a camera, a wearable device, or a home appliance device. The electronic device according to the embodiment of this document is not limited to the above-described devices.

Certain embodiments of this document and terms used therein are not intended to limit the technical features described in this document to specific embodiments, but it should be understood to include various modifications, equivalents, or substitutions of the embodiments. In connection with the description of the drawings, like reference numerals may be used for similar or related components. The singular form of the noun corresponding to the item may include one or more of the item, unless the relevant context clearly dictates otherwise. In this document, each of phrases such as "A or B", "at least one of A and B", "at least one of A or B", "A, B, or C", "at least one of A, B, and C", and "at least one of A, B, or C" may include any one of, or all possible combinations of, items listed together in the corresponding phrase of the phrases. Terms such as "first" or "second" may simply be used for distinguishing a corresponding component from other corresponding components, and do not limit the corresponding components in other respects (e.g., importance or order). When it is said that one (e.g., first) component is "coupled" or "connected" to another (e.g., second) component, with or without a term "functionally" or "communicatively", it means that the one component may be connected to the other component directly (e.g., by wire), wirelessly, or through a third component.

The term "module" used in certain embodiments of this document may include a unit implemented in hardware, software, or firmware, and may be used interchangeably with terms such as, for example, logic, a logic block, a part, or a circuit. A module may be an integrally formed part or a minimum unit or a portion of the part that performs one or more functions. For example, according to an embodiment, the module may be implemented in the form of an application-specific integrated circuit (ASIC).

Certain embodiments of this document may be implemented as software (e.g., the program 140) including one or more instructions stored in a storage medium (e.g., the internal memory 136 or the external memory 138) readable by a machine (e.g., the electronic device 101). For example, the processor (e.g., the processor 120) of the device (e.g., the electronic device 101) may call at least one command among one or more stored instructions from a storage medium and execute the command. This makes it possible for the device to be operated to perform at least one function according to the at least one called instruction. The one or more instructions may include a code generated by a compiler or a code executable by an interpreter. A device readable storage medium may be provided in the form of a non-transitory storage medium. Here, 'non-transitory' only means that the storage medium is a tangible device and does not include a signal (e.g., electromagnetic wave), and the term does not distinguish a case in which data are semi-permanently stored in the storage medium and a case in which data are temporarily stored in the storage medium.

According to an embodiment, the method according to certain embodiments disclosed in this document may be provided as included in a computer program product. Computer program products may be traded between sellers and buyers as commodities. The computer program product may be distributed in the form of a machine readable storage medium (e.g., compact disc read only memory (CD-ROM)), or may be distributed through an application store (e.g., Play Store™), directly between two user devices (e.g., smart-phones), or online (e.g., download or upload). In the case of online distribution, at least a portion of the computer program product may be at least temporarily stored or temporarily generated in a machine readable storage medium such as a memory of a server of a manufacturer, a server of an application store, or a relay server.

According to certain embodiments, each component (e.g., module or program) of the above-described components may include a singular entity or a plurality of entities, and some of the plurality of entities may be separately disposed in other components. According to certain embodiments, one or more components or operations of the above-described corresponding components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component of the plurality of components prior to the integration. According to certain embodiments, operations performed by a module, program, or other component may be executed sequentially, in parallel, repeatedly, or heuristically, or one or more of the operations may be executed in a different order, or omitted, or one or more other operations may be added.

What is claimed is:

1. An electronic device, comprising:
    a memory;
    a display module;
    a communication module; and
    a processor, configured to:
    control the display module to display an email configuration screen,
    determine whether a condition associated with reception of emails is configured by a user input in the email configuration screen,
    when an email reciting a sender is received, analyze a packet associated with the email,
    based on determining that the condition is configured and the packet indicates the condition, output a notification notifying the user of the email in an incoming call interface through a call application, wherein outputting the notification notifying the user of the email comprises displaying the sender recited from the email into the incoming call interface, and
    storing a record of the email in a call log, the record including the sender recited from the email, with one or more records of previous phone calls.

2. The electronic device of claim 1, wherein the processor is configured to:
    determine whether the analyzed packet corresponds to the condition; and
    output an email notification for the email through an email application, when the analyzed packet does not correspond to the condition.

3. The electronic device of claim 1, wherein the processor is configured to:
    based on determining that the condition is not configured according to the user input, output an email notification of the email through an email application.

4. The electronic device of claim 1, wherein the incoming call user interface is output in the call application based on determining that the condition is configured.

5. The electronic device of claim 1, wherein the condition includes at least one of a reception option condition, a sender condition, a subject condition, a recipient condition and carbon copy condition, a keyword condition, or an email option condition.

6. The electronic device of claim 1, wherein the incoming call user interface includes at least one of a visual notification, an audible notification, and/or a tactile notification.

7. The electronic device of claim 1, wherein the processor is configured to store and display the email within a call log.

8. The electronic device of claim 1, wherein the processor is configured to forward the received email and/or an identification corresponding to the received email to the call application.

9. The electronic device of claim 1, wherein the processor is configured to:
    determine whether the incoming call user interface for the email is output for a predetermined time period, and
    display the email, when the incoming call user interface is output for the predetermined time period.

10. The electronic device of claim 1, wherein the processor is configured to:
    determine whether an incoming call user interface for the email is output for a predetermined time period,
    display a missed call notification when the incoming call user interface is not received for the predetermined time period,
    display the call log when the call application is executed while displaying the missed call notification,
    when the record of the email is selected from the call log, display the email.

11. A method of receiving an email by an electronic device, the method comprising:
    displaying an email configuration screen;
    determine whether a condition is configured by a user input in the email configuration screen,
    wherein the condition, when detected, causes an email to be received as an incoming call;
    receiving an email reciting a sender and analyzing a packet associated with the email;
    based on determining that the condition is configured and that the packet indicates the condition, outputting a notification notifying the user of the email in an incoming call interface through a call application, wherein outputting the notification notifying the user of the email comprises displaying the sender recited from the email into the incoming call interface; and
    storing a record of the email in a call log, the record including the sender recited from the email, with one or more records of previous phone calls.

12. The method of claim 11, further comprising providing, when the analyzed packet does not correspond to the condition, outputting an email notification for the email through an email application.

13. The method of claim 11, further comprising:
    based on determining that the condition is not configured according to the user input, outputting an email notification for the email through an email application upon receiving the email.

14. The method of claim 11, wherein
    the incoming call user interface is output through the call application when the condition is configured according to the user input upon receiving the email.

15. The method of claim 11, wherein the condition includes at least one of a reception option condition, a sender condition, a subject condition, a recipient condition and cc condition, a keyword condition, or an email option condition.

16. The method of claim 11, wherein the incoming call user interface includes at least one of a visual notification, an audible notification, and/or a tactile notification.

17. The method of claim 11, further comprising storing and displaying the email within a call log.

18. The method of claim 11, further comprising forwarding the received email and/or an identification of the received email to the call application.

19. The method of claim 11, further comprising:
- determining whether the incoming call user interface is output for a predetermined time period; and
- when the incoming call user interface is output for the predetermined time period, displaying the email.

20. The method of claim 11, further comprising:
- determining whether the incoming call user interface is output for a predetermined time period;
- when the incoming call user interface is not output for the predetermined time period, displaying a missed call notification for the email;
- displaying the call log when the call application is executed while displaying the missed call notification; and
- when the record of the email is selected from the call log, displaying the email.

21. The electronic device of claim 1, wherein in response to receiving an input in the incoming call interface to answer an incoming call, display the email.

* * * * *